United States Patent
Patel et al.

(10) Patent No.: US 9,246,627 B2
(45) Date of Patent: Jan. 26, 2016

(54) JOINT OPTIMIZATION PROCEDURE FOR ROUTING AND WAVELENGTH ASSIGNMENT WITH COMBINED DEDICATED SHARED PROTECTIONS IN MULTI-CABLE MULTI-FIBER OPTICAL WDM NETWORKS

(75) Inventors: Ankitkumar N. Patel, East Brunswick, NJ (US); Philip Nan Ji, Plainsboro, NJ (US); Yoshiaki Aono, Tokyo (JP); Daisuke Taniguchi, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/588,365

(22) Filed: Aug. 17, 2012

(65) Prior Publication Data

US 2013/0216224 A1    Aug. 22, 2013

Related U.S. Application Data

(60) Provisional application No. 61/524,341, filed on Aug. 17, 2011.

(51) Int. Cl.
    *H04J 14/00*     (2006.01)
    *H04J 14/02*     (2006.01)

(52) U.S. Cl.
    CPC ......... *H04J 14/0278* (2013.01); *H04J 14/0257* (2013.01); *H04J 14/0267* (2013.01); *H04J 14/0268* (2013.01); *H04J 14/0294* (2013.01); *H04J 14/0295* (2013.01)

(58) Field of Classification Search
    CPC .............. H04J 14/0257; H04J 14/0267; H04J 14/0268; H04J 14/0278; H04J 14/0294; H04J 14/0295; H04J 14/021; H04Q 11/0005
    USPC ................................................. 398/57, 49, 48
    See application file for complete search history.

(56) References Cited

U.S. PATENT DOCUMENTS

| | | | | |
|---|---|---|---|---|
| 6,631,245 B1 * | 10/2003 | Bendelli | ............. | H04J 14/0212 398/45 |
| 6,714,552 B1 * | 3/2004 | Cotter | ..................... | H04L 45/02 370/256 |
| 6,731,648 B1 * | 5/2004 | Cotter | ..................... | H04L 45/06 370/249 |
| 7,283,741 B2 * | 10/2007 | Sadananda | ............. | H04L 45/02 398/5 |
| 7,301,911 B2 * | 11/2007 | Mack-Crane | ............. | H04J 3/14 370/254 |
| 7,308,198 B1 * | 12/2007 | Chudak | ................... | H04L 45/02 398/58 |
| 7,627,243 B2 * | 12/2009 | Sadananda | ........... | H04J 14/0295 398/7 |
| 7,639,944 B2 * | 12/2009 | Wang | ................... | H04J 14/0227 398/3 |
| 7,689,120 B2 * | 3/2010 | Hoang | .................... | H04L 45/02 398/57 |
| 7,697,455 B2 * | 4/2010 | Sadanada | ............ | H04L 43/0811 370/217 |
| 7,821,946 B2 * | 10/2010 | Mack-Crane | ............. | H04J 3/14 370/238 |
| 7,848,651 B2 * | 12/2010 | Hoang | .................... | H04L 45/02 398/57 |
| 7,853,147 B2 * | 12/2010 | Tanaka | ............... | H04Q 11/0062 398/48 |

(Continued)

*Primary Examiner* — Ken Vanderpuye
*Assistant Examiner* — Abbas H Alagheband
(74) *Attorney, Agent, or Firm* — Joseph Kolodka

(57) ABSTRACT

A joint-optimization method addresses the generalized routing and wavelength assignment problem with variable number of combined 1+1 dedicated and shared connections. The inventive method enables a solution in time that is polynomial of the input size. Thus, the time complexity of the joint-optimization method is significantly less than that of existing methods.

16 Claims, 5 Drawing Sheets

6-node network

Layered Graph

(56) References Cited

U.S. PATENT DOCUMENTS

| | | | | | |
|---|---|---|---|---|---|
| 7,860,392 | B2* | 12/2010 | Hoang | H04L 45/02 | 398/57 |
| 7,889,675 | B2* | 2/2011 | Mack-Crane | H04L 45/12 | 370/254 |
| 8,125,891 | B2* | 2/2012 | Mack-Crane | H04J 3/14 | 370/216 |
| 8,144,626 | B2* | 3/2012 | Zhang | H04L 45/00 | 370/255 |
| 8,233,397 | B1* | 7/2012 | Bhandari | H04Q 11/0062 | 370/237 |
| 8,244,127 | B2* | 8/2012 | Sadananda | H04Q 11/0062 | 398/25 |
| 8,768,167 | B2* | 7/2014 | Tanna | H04J 14/0257 | 398/175 |
| 2002/0030864 | A1* | 3/2002 | Chaudhuri | H04J 14/0227 | 398/5 |
| 2002/0071392 | A1* | 6/2002 | Grover | H04J 14/0227 | 370/241 |
| 2002/0080435 | A1* | 6/2002 | Lu | H04L 45/62 | 398/49 |
| 2004/0208560 | A1* | 10/2004 | Gumaste | H04J 14/0227 | 398/59 |
| 2005/0069314 | A1* | 3/2005 | De Patre | H04J 14/0227 | 398/5 |
| 2005/0201323 | A1* | 9/2005 | Mani | H04B 10/25755 | 370/328 |
| 2007/0172237 | A1* | 7/2007 | Risbood | H04J 14/0241 | 398/59 |
| 2009/0257746 | A1* | 10/2009 | Reina | H04J 14/0284 | 398/34 |
| 2010/0129078 | A1* | 5/2010 | Weston-Dawkes | H04J 14/0212 | 398/79 |
| 2010/0142943 | A1* | 6/2010 | Frankel | H04B 10/0795 | 398/25 |
| 2012/0201541 | A1* | 8/2012 | Patel | H04J 14/0212 | 398/58 |
| 2013/0163983 | A1* | 6/2013 | Skoog | H04J 14/0227 | 398/5 |

* cited by examiner

JOINT OPTIMIZATION PROCEDURE FOR ROUTING AND WAVELENGTH ASSIGNMENT WITH COMBINED DEDICATED SHARED PROTECTIONS IN MULTI-CABLE MULTI-FIBER OPTICAL WDM NETWORKS

RELATED APPLICATION INFORMATION

This application claims priority to provisional application No. 61/524,341 filed Aug. 17, 2011, the contents thereof are incorporated herein by reference

BACKGROUND OF THE INVENTION

The present invention relates generally to optical communications, and more particularly to a joint optimization procedure for routing and wavelength assignment with combined dedicated shared protections in multi-cable multi-fiber optical WDM networks.

With advance modulation schemes, each channel in optical WDM networks can support several hundred gigabits or more per second data rate. Any failure in such high capacity networks can cause large amounts of data and revenue losses. Thus, in order to meet the service level agreement to end users, provisioning survivability is an essential requirement in optical WDM networks. Failure of an optical channel is mainly caused by either a transponder failure or a fiber cable cut. Survivability to a transponder failure can be provisioned by deploying redundant transponders that are referred to as backup transponders at end nodes. Survivability to a fiber cable cut can be provisioned by allocating redundant channel resources along fiber cable-disjoint routes, where one of the routes is referred to as a working route and the others are referred to as backup routes. In order to minimize the channel switching time in case of a failure, data can simultaneously be transferred on both working and backup routes by allocating dedicated resources. Such protection mechanism is referred to as the 1+1 dedicated protection [JSimmons]. While provisioning survivability through 1+1 dedicated protection, the required number of wavelengths in the network is increased by at least the factor of the number of 1+1 dedicated protection routes requested by a traffic demand, and that cannot be used to support other network traffic. Thus, as the requested number of 1+1 dedicated protection routes increases, survivability of the traffic demand increases; however, the wavelength utilization decreases.

It is noted here that the term "fiber cable" (or simply "cable") refers to the physical bundle of fibers within the same assembly, this is also called "fiber trunk" sometimes. Each cable can contain multiple optical fibers or just a single optical fiber. If they are n fibers between two optical network nodes, these fibers can be contained within the same fiber cable, or they can be distributed among n cables containing 1 fiber each, or they can be distributed among m cables where 1≤m≤n. Once a fiber cable is cut, all the fibers contained within the cable are disconnected, but other cables might not be affected.

Wavelength resource utilization can be improved if the backup wavelengths along the backup routes can be shared among multiple working connections that are routed on fiber cable-disjoint routes. Such protection mechanism is referred to as the shared protection. The connection switching time in the shared protection mechanism is increased by the port switching time and signal propagation time between end users compared to the 1+1 dedicated protection mechanism.

The survivability of time-critical applications can be increased in an efficient manner by provisioning a traffic demand with combined 1+1 dedicated and shared protections. The survivability of a traffic demand is improved exponentially with the number of total protection routes and the number of transponders, given the assumption that a failure of each fiber cable and a failure of each transponder are independent. Our invention here is an efficient method that addresses the routing and wavelength assignment problem that provisions survivability through combined dedicated and shared protection mechanism in multi-cable multi-fiber optical WDM networks. This is the first time such problem is addressed and solved. The problem is defined as follows.

We are given a network topology $G(V, E)$, where V is a set of nodes and E is a set of edges. Nodes i and j are connected through $F_{ij}$ number of fiber cables. Let $f_{ij}^p$ denotes the number of fibers confined within $p^{th}$ fiber cable connecting nodes i and j. We need to establish a set of traffic demands A in the network, where a traffic demand $R(s, d, x, y)$ is requesting a working live-connection, x number of 1+1 dedicated backup live-connections, and y number of shared backup connections between source s and destination d. For each traffic demand, x+1 number of dedicated transponders are provisioned at end nodes to support working and x number of 1+1 dedicated live-connections. The released transponder due to any failure of a live-connection can be used to establish a new backup live-connection along one of the shared backup connections. Thus, in case of failures of l live-connections, if 1≤y, the network can guarantee x+1 number of live-connections for a given traffic demand, otherwise, the network can support (x+1+y−l) number of live-connections. We need to find working, 1+1 dedicated backup, and shared connections, routing of these connections over physical topology, and operating wavelength of each connection such that wavelength utilization of the network is maximized. The network is transparent, and does not have traffic grooming or wavelength conversion capabilities. We refer to this problem as routing and wavelength assignment with combined dedicated and shared protections in multi-cable multi-fiber optical WDM networks.

It is noted that a "connection" represents the reserved wavelength resources along the route. A "live-connection" represents a connection with live data transfers. A wavelength in a fiber cable is referred to as a wavelength link.

So far, there is no existing solution for the routing and wavelength assignment problem with variable number of 1+1 dedicated and shared connections in multi-cable multi-fiber WDM networks. Applicants are the first to propose an efficient procedure to solve it.

If one restricts x=0 and y=0, the problem is transformed into the conventional routing and wavelength assignment problem in multi-fiber WDM networks. When x=1 and y=0, the problem is transformed into routing and wavelength assignment with 1+1 dedicated path protection. On the other hand, when x=0, and y=1, the problem is transformed into routing and wavelength assignment with shared path protection.

In another work, there was proposed a routing and wavelength assignment procedure when x=1 and y=1. The addressed problem has an additional constraint that was found working, 1+1 dedicated, and shared connections must be not only link-disjoint but also node-disjoint. In another prior work, the authors propose routing and wavelength assignment procedure when x=2, y=0, and x=0, y=2. In both these prior works, the problem was formulated using an Integer Linear Programming (ILP). The required time to solve the problem using the proposed methods increases exponentially with the input size, and thus, the proposed ILP formulations are not realistic approaches to address the problem in real time.

So far, the above mentioned prior works address the specific sub-problems of the problem addresses in this invention record. Furthermore, the proposed solutions address only the case when each fiber is confined within a separate fiber cable, and do not applicable for the any other distribution of fibers within fiber cables.

Accordingly, there is a need for a joint optimization procedure for routing and wavelength assignment with combined dedicated shared protections in multi-cable multi-fiber optical WDM networks.

BRIEF SUMMARY OF THE INVENTION

The present invention is directed to a joint optimization method for finding a routing and wavelength assignment for a given set of traffic demands requiring variable number of dedicated and shared protections, including constructing a layered graph for finding fiber cable link disjoint routes in a multi-fiber cable; applying, jointly, a routing and first-fit wavelength assignment for finding x+1 number of fiber cable link disjoint routes operating on different wavelengths in the layered graph; modifying the layered graph to maximize sharing of wavelengths; applying, jointly, routing and wavelength assignment based on maximum sharing factor to find y number of fiber cable link-disjoint routes in the layered graph; finding working 1+1 dedicated connections and then shared connections; searching k different solutions of dedicated and shared connections operating on K different wavelengths; selecting one of the solutions requiring a minimum number of wavelength links; and modifying Bhandari's procedure to find link-disjoint routes in the layered graph.

These and other advantages of the invention will be apparent to those of ordinary skill in the art by reference to the following detailed description and the accompanying drawings.

DETAILED DESCRIPTION

The present invention is directed to a joint-optimization procedure for the first time to address the routing and wavelength assignment problem with combined dedicated and shared protections in multi-cable multi-fiber WDM networks. The inventive joint-optimization procedure addresses the generalized routing and wavelength assignment problem with variable number of combined 1+1 dedicated and shared connections for the first time. The invention technique provides a solution in time that is polynomial of the input size. Thus, the time complexity of the joint-optimization procedure is significantly less than that of existing methods.

In the joint-optimization procedure, the routing and wavelength assignment sub-problems are addressed jointly using a layered graph-based approach. Let, G(V, E) denotes a given physical topology, where V is a set of vertices and E is a set of edges. $F_{ij}$ denotes the number of fiber cables connecting vertices i and j, and $f_{ij}^p$ denotes the number of fibers confined within fiber cable p connecting nodes i and j. Each fiber cable between nodes i and j is assigned a unique identification p, where $1 \leq p \leq F_{ij}$, and each fiber within a fiber cable p connecting nodes i and j is assigned a unique identification q, where $1 \leq q \leq f_{ij}^p$. We are given a set of traffic demands A in which a traffic demand R(s, d, x, y) requests a survivable connection between source s and destination d with x number of 1+1 dedicated connections and y number of shared connections. Each request is identified by a unique identification r, where $1 \leq r \leq |A|$. End nodes are equipped with x number of dedicated transponders to provide survivability against transponder failures.

Figure 1:
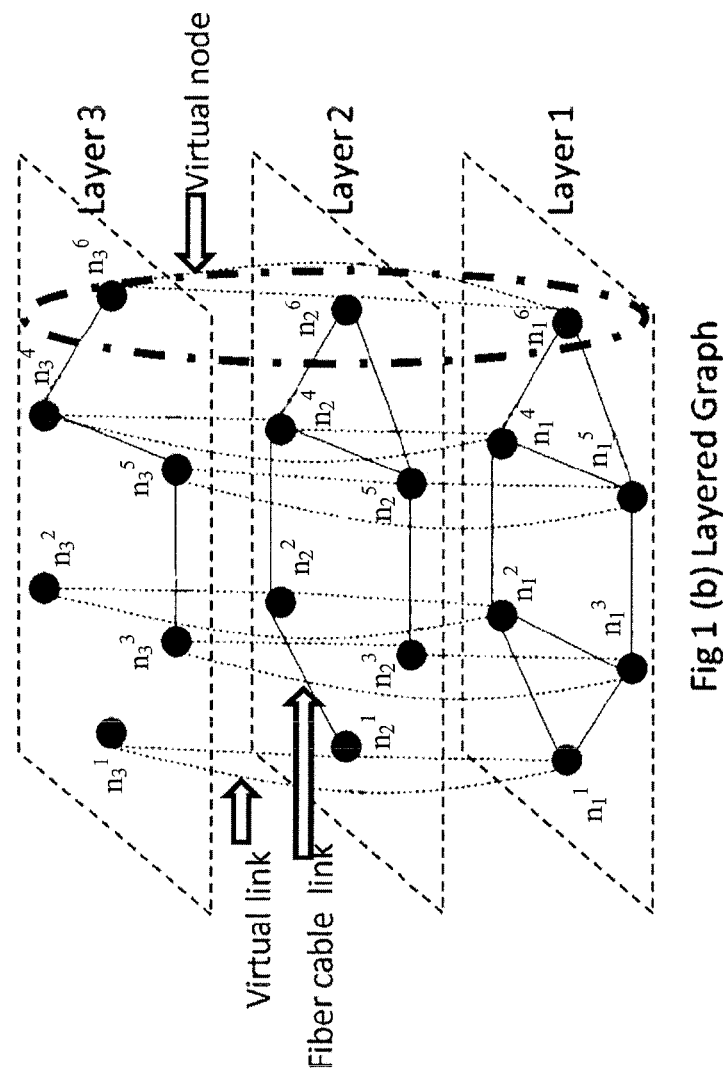
FIGS. 1($a$) and 1($b$) show an exemplary 6-node network and its corresponding layered graph, respectively.
Figure 1:
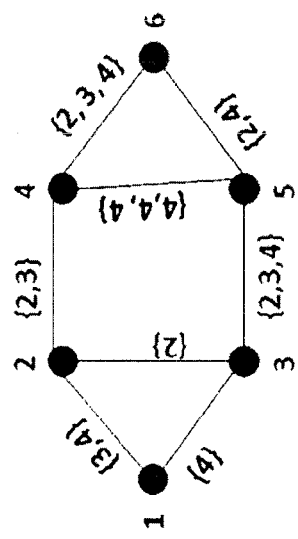

First, we construct a layered graph G'(N, L), where N is a set of nodes and L is a set of links. In the layered graph G', the given graph G is replicated for $\max_{(i,j) \in E} F_{ij}$ number of times, and each replication is identified by a layer l, where $1 \leq l \leq \max_{(i,j) \in E} F_{ij}$. A set of nodes in the $l^{th}$ layer is denoted as $N_l$, where $|N_l|=|V|$, $U_l N_l = N$, and a node i in the $l^{th}$ layer is denoted as $n_l^i$. Node $n_l^i$ with $n_m^i$ are connected, $\forall l, m$, where $1 \leq l, m \leq \max_{(i,j) \in E} F_{ij}$. A link $(n_l^i, n_m^i)$, $\forall l, m$, is referred to as a virtual link. An $i^{th}$ vertex in the given graph G is represented by a set of nodes $\{n_l^i | \forall l\}$ which is referred as a virtual node. Links connecting nodes $n_l^i$ to $n_l^j$ are removed at all layers with ID l that is greater than $F_{ij}$. Thus, the number of times, nodes $n_l^i$ and $n_l^j$, $\forall l$, are connected in the layered graph, is equivalent to the number of fiber cables connecting nodes i and j in the given physical topology G, and a link connecting nodes $n_l^i$ and $n_l^j$ represents a fiber cable with ID l connecting nodes i and j in the given graph. The link $(n_l^i, n_l^j)$, $\forall l$, in the layered graph is referred to as a fiber cable link. FIG. 1($a$) shows a layered graph for 6-node network topology for further clarifications. A set of integers on each edge represents the number of fiber cables and the number of fibers within each fiber cable. The size of a set represents the number of fiber cables $F_{ij}$ connecting a pair of vertices i and j, and the $p^{th}$ element of a set represents the number of fibers $f_{ij}^p$ confined within $p^{th}$ fiber cable. The corresponding layered graph is illustrated in FIG. 1($b$) in which the number of fiber cable links between a pair of nodes is equivalent to the number of fiber cables (the size of a set) between a pair of vertices.

A given set of traffic demands, A, are arranged into descending order of their minimum hop distance. Routing and wavelength assignment sub-problems are addressed jointly for each request one-by-one by modifying the constructed layered graph. For the selected request r the process finds K potential routing and wavelength assignment solutions as follows.

The process starts from the lowest wavelength w. If a wavelength w is available on at least one of the fibers confined into a fiber cable l connecting a pair of nodes $n_l^i$ and $n_l^j$, then a fiber cable link connecting nodes $n_l^i$ and $n_l^j$ exists, and a unit cost is assigned to it, otherwise nodes $n_l^i$ and $n_l^j$ are disconnected. All virtual links connecting $n_l^i$ and $n_m^i$, for l, m, where $1 \leq l, m \leq \max_{(i,j) \in E} F_{ij}$, a very negligible cost is assigned. In the modified layered graph, we apply modified Bhandari's optimal procedure, presented in FIG. 3, in which $P_m$ denoted an $m^{th}$ route, where $1 \leq m \leq \max(x+1, y)$ to find x+1 number of link disjoint routes. The found x+1 number of link-disjoint routes represents one working route and x number of 1+1 dedicated backup routes operating on the same wavelength w. If x+1 number of fiber cable link-disjoint routes do not exist at the same wavelength w in the layered graph, then the procedure increments the wavelength w, and repeats the same process until either x+1 number of fiber cable link-disjoint routes is found, or all wavelengths are taken into account.

After considering all wavelengths, if x+1 number of link-disjoint routes is not available, then the procedure finds the link-disjoint routes operating on different wavelengths as follows. The procedure restarts the search from the lowest wavelength w, modifies the layered graph based on the availability of the selected wavelength as mentioned earlier, and finds up to x+1 number link disjoint routes using the modified Bhandari's procedure. Among the found routes, one of the routes is selected as a working route operating on wavelength w, and the rest of the routes are considered as 1+1 dedicated routes operating on wavelength w. If x+1 link-disjoint routes are not available at the same wavelength w, then the remaining link-disjoint routes are found by modifying the layered graph as follows. The procedure removes the links along the already found routes out of x+1 routes from the layered graph. The virtual links $(n_l^i, n_m^i) \forall i, j$ along the already found routes are not removed. If a wavelength w is available on at least one of the fibers confined into a fiber cable l connecting a pair of nodes $n_l^i$ and $n_l^j$, then a fiber cable link connecting nodes $n_l^i$ and $n_l^j$ exists, and a unit cost is assigned to it, otherwise nodes $n_l^i$ and $n_l^j$ are disconnected. All virtual links connecting $n_l^i$ and $n_m^i$, for l, m, where $1 \le l$, $m \le \max_{(i,j) \in E} F_{ij}$, a very negligible cost is assigned. The procedure applies the modified Bhandari's procedure in the modified layered graph to find the remaining routes. The process is repeated until either x+1 link disjoint routes are found or all wavelengths are taken into account. In this approach, the 1+1 dedicated routes may operate on different wavelengths.

Among the found routes, the working route of a request r is recorded as $k^{th}$ solution in a set $W_r^k$. The operating wavelength of the working route is recorded in $F_r^k$, and the corresponding set of fibers in which the wavelength w is available along the route $W_r^k$ is recorded in a set $U_r^k$. The 1+1 dedicated backup routes are recorded in sets $B_r^{km}$, and corresponding wavelengths are recorded in $H_r^{km}$. A set of fibers in which the wavelength $H_r^{km}$ is available along the routes $B_r^{km}$ is recorded in a set $Z_r^{km}$, where $1 \le m \le x$. The procedure increments the k, and repeats the same process until K potential working and 1+1 dedicated connections are found.

For each wavelength w in a fiber q that is confined within fiber cable link l connecting nodes $n_l^i$ and $n_l^j$, the ID of all successfully established requests that use the wavelength w for shared protection is recorded in the conflict sets $Q_{n_l^i n_l^j}^{qw}$. The shared connections for a request r are found as follows.

The procedure selects one of the solution k out of K potential solutions of the request r. For all $r_1 \in Q_{n_l^i n_l^j}^{qw}$, $\forall n_l^i, n_l^j, q, w$, if $W_{r_1}^k$ and $B_{r_1}^{km}$ are fiber cable link-disjoint routes to the found solutions, $W_r^k$ and $B_r^{km}$, of request r where $1 \le m \le x$, then the wavelength w in the $q^{th}$ fiber of $l^{th}$ fiber cable connecting nodes i and j can be shared by a request r. Find the number of fiber cables on which a wavelength w can be shared. We refer to this number as a sharing factor of a wavelength. Order all wavelengths in descending order of their sharing factor. Starting from a wavelength w with the maximum sharing factor, the procedure modifies the layered graph by removing those fiber cable links along which wavelength w is not available on any of the fibers confined within it. If a wavelength w is available on a fiber cable link, and it cannot be shared, then a cost $|N|*(|N|-1)$ is assigned to the fiber cable link. If a wavelength w is available on a fiber cable link, and it can be shared, then a unit cost is assigned to a fiber cable link. All virtual links connecting nodes $n_l^i$, and $n_m^i$, $\forall$ m, l, a very negligible cost is assigned. All fiber cable links along the selected $k^{th}$ solution of working and 1+1 dedicated backup routes, $W_r^k$ and $B_r^{km}$, are removed from the layered graph (the virtual links $(n_l^i, n_m^i) \forall l$ along the selected $k^{th}$ solution of working and 1+1 dedicated backup routes, $W_r^k$ and $B_r^{km}$, are not removed), where $1 \le m \le x$. The procedure applies the modified Bhandari's procedure to find up to y number of link disjoint routes. If all y routes are not available at the same wavelength w, then the remaining link-disjoint shared routes are found by removing fiber cable links along the selected $k^{th}$ solution of working $W_r^k$, 1+1 dedicated backup routes $B_r^{km}$, and already found shared routes out of y routes from the layered graph (the virtual links $(n_l^i, n_m^i) \forall l$ along the selected $k^{th}$ solution of working $W_r^k$, 1+1 dedicated backup routes $B_r^{km}$, and already found shared routes out of y routes are not removed). The layered graph is modified by removing those fiber cable links along which the next wavelength w from the sorted pool of wavelengths is not available on any of the fibers confined within it. If a wavelength w is available on a fiber cable link, and it cannot be shared, then a cost $|N|*(|N|-1)$ is assigned to the fiber cable link. If a wavelength w is available on a fiber cable link, and it can be shared, then a unit cost is assigned to a fiber cable link. All virtual links connecting nodes $n_l^i$, and $n_m^i$, $\forall$ m, l, a very negligible cost is assigned. The procedure applies the modified Bhandari's procedure in the modified layered graph to find the remaining routes. The process is repeated until either y number of fiber cable link disjoint routes is found or all wavelengths are taken into account. The found shared routes are recorded in sets $S_r^{km}$, and corresponding wavelengths are recorded in $T_r^{km}$. A set of fibers in which the wavelength $T_r^{km}$ is available is recorded in a set $O_r^{km}$, where $1 \le m \le x$.

The procedure increments the k, and repeats the same process until y routes for all K potential solutions are found. Finally, out of K potential solutions, the procedure selects a solution k' that requires minimum number of new wavelengths. For each wavelength $w = T_r^{k'm}$ on the fiber $q \in O_r^{k'm}$ confined within the fiber cable links $(n_l^i, n_l^j) \in S_r^{k'm}$ of the selected solution k' the request ID r is recorded in the conflict sets $Q_{n_l^i n_l^j}^{qw}$. The found routing solutions can easily be mapped onto the original network G by removing all virtual links along the routes, and mapping virtual nodes to the vertices. The fiber cable link ID represents the ID of a fiber cable. The recorded wavelength and the recorded set of fibers are the operating wavelength and the fibers along the fiber cables.

Figure 2A:
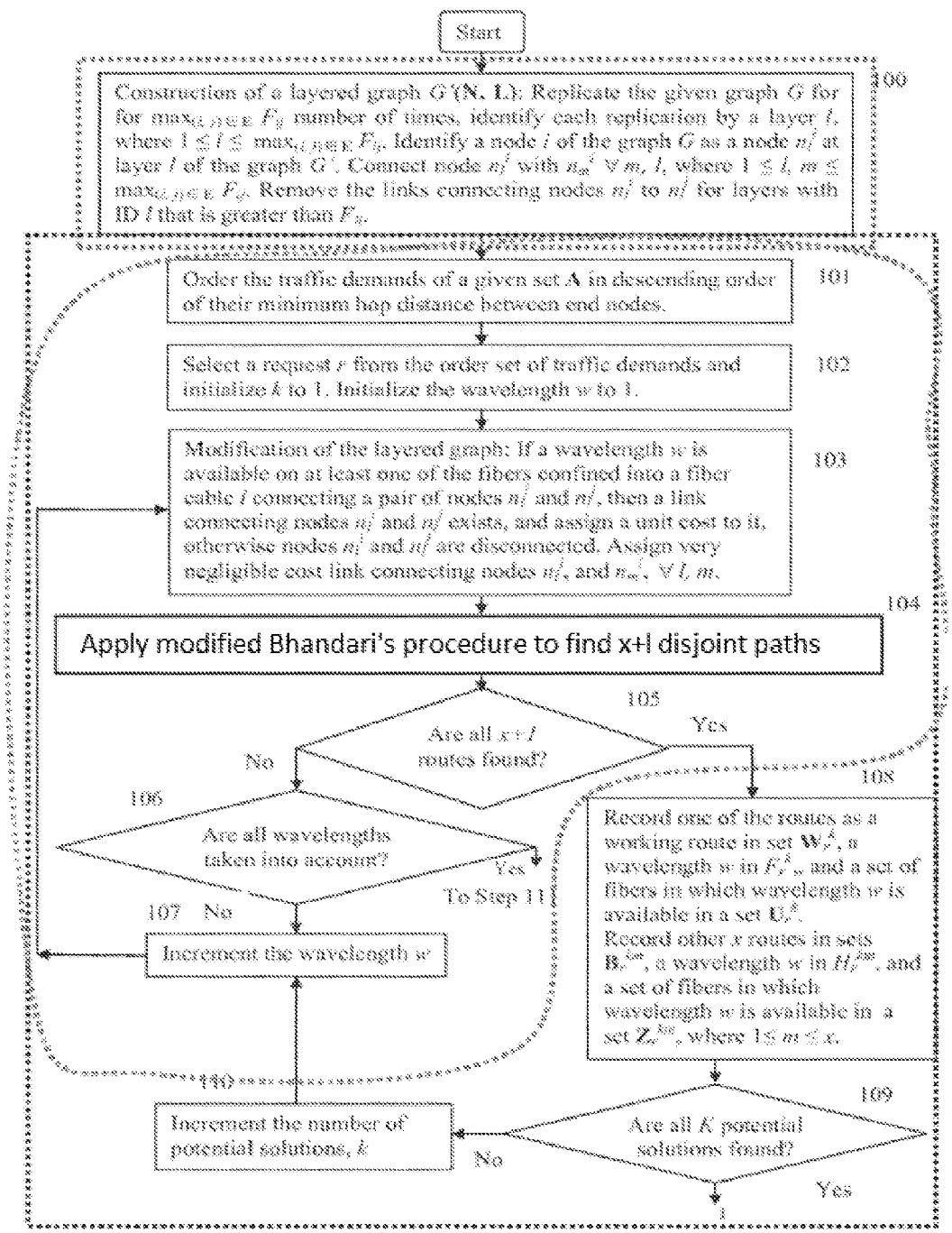
FIGS. 2($a$), 2($b$) and 2($c$) is are parts of a flow diagram of the joint optimization procedure, in accordance with the invention.
Figure 2:
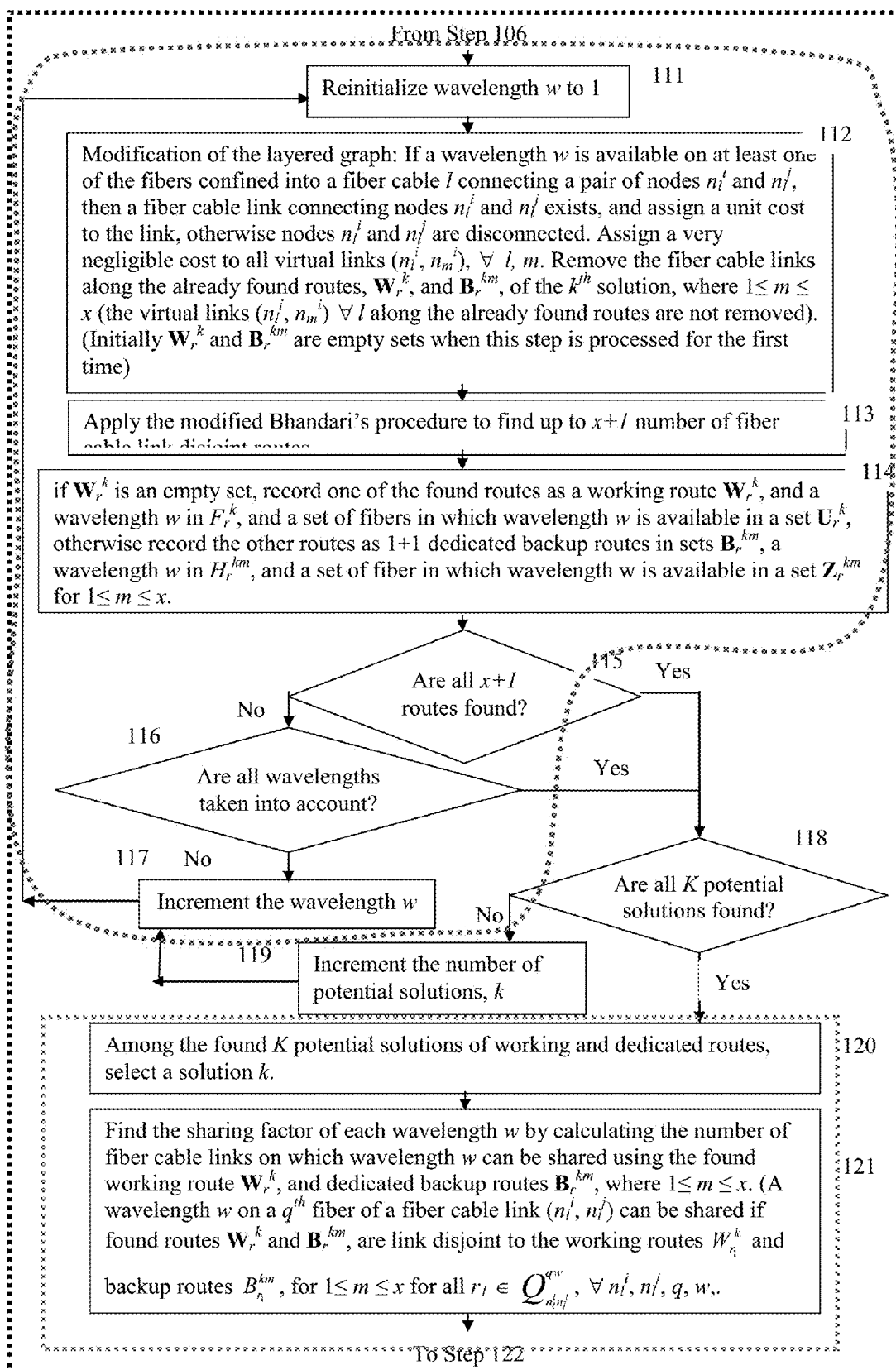
Figure 2:
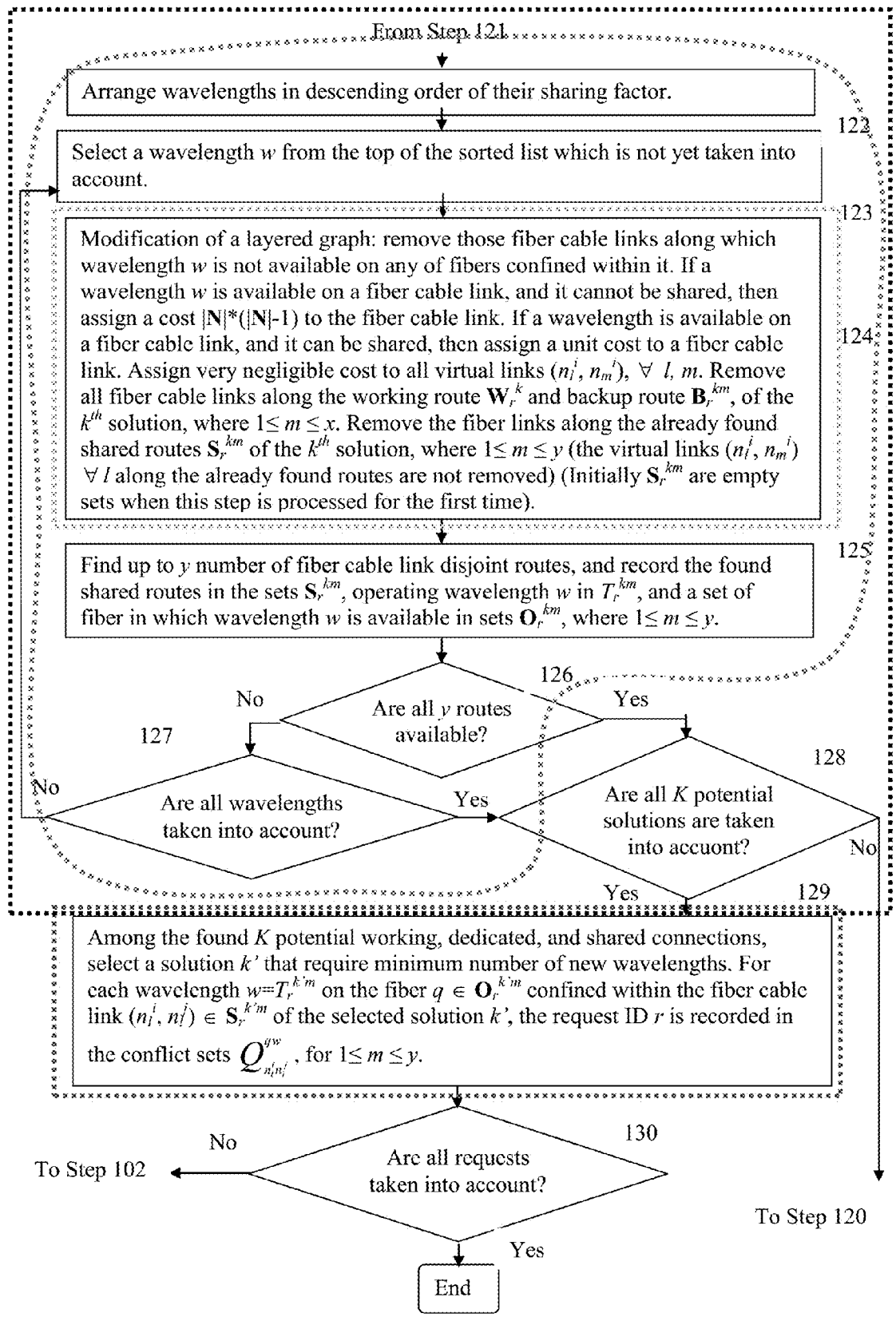

In FIG. 2, there is shown a diagram of the flowchart of the joint-optimization procedure in accordance with the invention. The diagram is explained as follows:

At step 100, there is constructed a layered graph G'(N, L) from the given graph G(V, E). The procedure replicates the given graph G for $\max_{(i,j) \in E} F_{ij}$ number of times that is the maximum number of fiber cables between any pair of nodes in the given graph. Each replication is identified as a layer l, where $1 \le l \le \max_{(i,j) \in E} F_{ij}$, and each node i in the graph G is identified as node $n_l^i$ at layer l of the graph G'. A node i across different layers are connected by establishing a link connecting nodes $n_l^i$ and $n_m^i$, $\forall$ l, m, where $1 \le l$, $m \le \max_{(i,j) \in E} F_{ij}$. This links $(n_l^i, n_m^i) \forall l$, m, are referred to as virtual links. A link connecting different nodes within the same layer is denoted as a fiber cable link. The procedure removes all links connecting nodes $n_l^i$ to $n_l^j$ for layers with ID l that is greater than $F_{ij}$. Thus, total number of links connecting nodes $n_l^i$ to $n_l^j$ is equivalent to the number of fiber cables connecting nodes i and j in the given graph G.

At step 101, the procedure orders the given set of requests A in descending order of the minimum hop distance between end nodes. This ordering scheme increases the likelihood of accepting longer requests with wavelength continuity constraints, and also be fair in accommodating longer requests with respect to shorter requests. However, if different fairness levels is required (such as, giving priority to the shortest request to increase total network throughput), this order can be rearranged easily to reflect such fairness requirement (such as sorting the list in ascending order of the minimum hop distance between end nodes).

At step 102, the procedure picks a request r from the sorted pool of requests, initializes k to 1, and considers the wavelength w to the lowest wavelength 1.

At step 103, the procedure modifies the layered graph based on the availability of the selected wavelength w. Each fiber cable link in the layered graph is checked for the availability of a wavelength w. If wavelength w is available on at least one of the fibers confined within the fiber cable, then the fiber cable link exists in the layered graph, otherwise the fiber cable link is disconnected. A unit cost is assigned to all existing fiber cable links in the modified layered graph. A very negligible cost is assigned to all virtual links connecting nodes $n_l^i$ and $n_m^i$, $\forall l, m$. This modified layered graph can be used to address the routing and wavelength assignment sub-problems jointly.

At step 104, the procedure applies the modified Bhandari's procedure to find x+1 number of fiber cable link disjoint paths in the modified layered graph. Application of modified Bhandari's procedure guarantees to find x+1 number of fiber cable link disjoint routes operating on wavelength w with minimum cost that represents the number of required wavelength links. This procedure minimizes the number of required wavelength links in the network which can be used for other requests.

At step 105, there is a check of whether all x+1 number of fiber cable link disjoint routes operating on wavelength w are available. If the routes are available, then the procedure follows the step 106, otherwise the procedure follows the step 108.

At step 106, there is a check of whether all wavelengths are taken into consideration. If there is any wavelength which is not yet taken into consideration, then the procedure follows the step 107, otherwise the procedure follows the step 111.

At step 107, the procedure increments the wavelength w, and repeats the step 103.

At step 108, one of the routes among the found routes is recorded as a working route in a set $W_r^k$, and corresponding wavelength w is recorded in $F_r^k$. A set of fibers in which wavelength w is available is recorded in a set $U_r^k$. The rest of the routes are recorded in sets $B_r^{km}$, and corresponding wavelengths are recorded in $H_r^{km}$. A set of fibers in which the wavelength $H_r^{km}$ is available is recoded in a set $Z_r^{km}$, where $1 \leq m \leq x$.

At step 109, there is a check of whether all K potential solutions are found. If the number of potential solutions is less than the K, then the procedure follows step 110, otherwise the procedure follows the step 120.

At step 110, there is an increment of k, and then a repeat of step 107.

At step 111 the procedure reinitializes the wavelength w to the lowest wavelength 1.

At step 112, the procedure modifies the layered graph the same way as mentioned in step 103. Additionally, this step removes fiber cable links along the already found working route $W_r^k$ and backup routes $B_r^{km}$ of the $k^{th}$ solution of a request r (the virtual links $(n_l^i, n_m^i)$ $\forall l$ along the already routes are not removed). This step is only visited if the previous steps (up to step 111) are not able to find exactly x+1 number of fiber cable link disjoint routes at the same operating wavelength w. When this step is visited for the first time (Immediately after step 111), the working route $W_r^k$ and backup routes $B_r^{km}$ are empty sets for $1 \leq m \leq x$.

At step 113, the procedure applies the modified Bhandari's procedure to find up to x+1 number of fiber cable link disjoint routes.

At step 114, among the found routes in Step 113, one of the routes is considered as a working route and stored in the set $W_r^k$, corresponding wavelength w is recoded in $F_r^k$, and a set of fibers in which a wavelength $F_r^k$ is available is recorded in a set $U_r^k$. The rest of the routes are considered as 1+1 dedicated backup routes and recorded into sets $B_r^{km}$, corresponding wavelengths are recorded in $H_r^{km}$, and a set of fibers along which a wavelength $H_r^{km}$ is available is recorded in a set $Z_r^{km}$ for $0 \leq m \leq x$.

At step 115, there is a check of whether all x+1 number of fiber cable routes are found so far. If the number of found routes is less than x+1, then the procedure follows step 116, otherwise the procedure follows step 118.

At step 116, there is a check of whether all wavelengths are taken into account. If a wavelength is still not considered, then the procedure follows step 117, otherwise the procedure follows step 118.

At step 117, the procedure increments a wavelength w, and repeats the step 111.

At step 118, the procedure checks whether all k potential solutions are found. If the number of found solutions is smaller than K, then the procedure follows step 119, otherwise the procedure follows the step 120.

At step 119, the procedure increments the k, and repeats step 117. At step 120, the procedure selects one of the K found potential solutions.

At step 121, the procedure finds the sharing factor of each wavelength w. The sharing factor of a wavelength is defined as the number of fiber cables on which the wavelength can be shared. If found working route $W_r^k$ and 1+1 dedicated backup routes $B_r^{km}$ of a request r are link disjoint to working routes $W_{r_1}^k$ and $B_{r_1}^{km}$ for all $r_1 \in Q_{n_l^i n_j^j}^{qw}$, $\forall n_l^i, n_l^j, q, w$, then the wavelength w on the $q^{th}$ fiber of the fiber cable link $(n_l^i, n_l^j)$ can be shared.

At step 122, the procedure arranges wavelengths according the descending order of the sharing factor. At step 123, the procedure selects a wavelength w from the top of the sorted pool of wavelengths in step 122.

At step 124 procedure modifies the layered graph. The procedure removes those fiber cable links along which wavelength w is not available on any of fibers confined within it. If a wavelength w is available on a fiber cable link, and it cannot be shared, then the procedure assigns a cost $|N|*(|N|-1)$ to the fiber cable link. If a wavelength is available on a fiber cable link, and it can be shared, then the procedure assigns a unit cost to a fiber cable link. The procedure assigns a very negligible cost to all virtual links connecting nodes $n_l^i$ and $n_m^i$, $\forall l, m$. Finally, the procedure removes all the fiber cable links along the working route $W_r^k$ and backup route $B_r^{km}$, where $1 \leq m \leq x$ of the $k^{th}$ solution of a request r. The procedure also removes all fiber links along the already found shared routes $S_r^{km}$ of the $k^{th}$ solution, where $1 \leq m \leq y$. (the virtual links $(n_l^i, n_m^i)$ $\forall l$ along the already found routes are not removed) This modification of a layered graph can be used to find routes that can maximize the sharing of allocated wavelengths in the network. When this step is visited for the first time (Immediately after step 123), the shared routes $S_r^{km}$ are empty sets for $1 \leq m \leq y$.

At step 125, the procedure finds up to y number of fiber cable link disjoint routes using the modified Bhandari's procedure, and records the found routes in sets $S_r^{km}$, corresponding wavelengths in $T_r^{km}$, and a set of fibers in which the wavelength $T_r^{km}$ is available in a set $O_r^{km}$, where $1 \leq m \leq y$.

At step 126, the procedure checks whether all y routes are found. If less than y number of routes are found so far, then the procedure follows step 127, otherwise the procedure follows step 128.

At step 127, the procedure checks whether all wavelengths are taken into account. If any wavelength is still not taken into consideration from the sorted pool of wavelengths found in step 123, then the procedure follows step 123, otherwise the procedure follows step 128.

At step 128, the procedure checks whether all K potential solutions are taken into account so far. If any potential solution is still not taken into account, then the procedure follows step 120, otherwise the procedure follows step 129.

At step 129, the procedure finds a solution k' out of K potential solution that require minimum number of novel wavelengths. For each wavelength $w=T_r^{k'm}$ on the fibers $q \in O_r^{k'm}$ confined within the fiber cable links $(n_l^i, n_l^j) \in S_r^{k'm}$ of the selected solution k', the request ID r is recorded in the conflict sets $Q_{n_l^i n_l^j}^{qw}$.

At step 130, the procedure checks whether all requests are taken into account. If a solution for any request is still not found, then the procedure follows step 102, otherwise the process is terminated.

Figure 3:
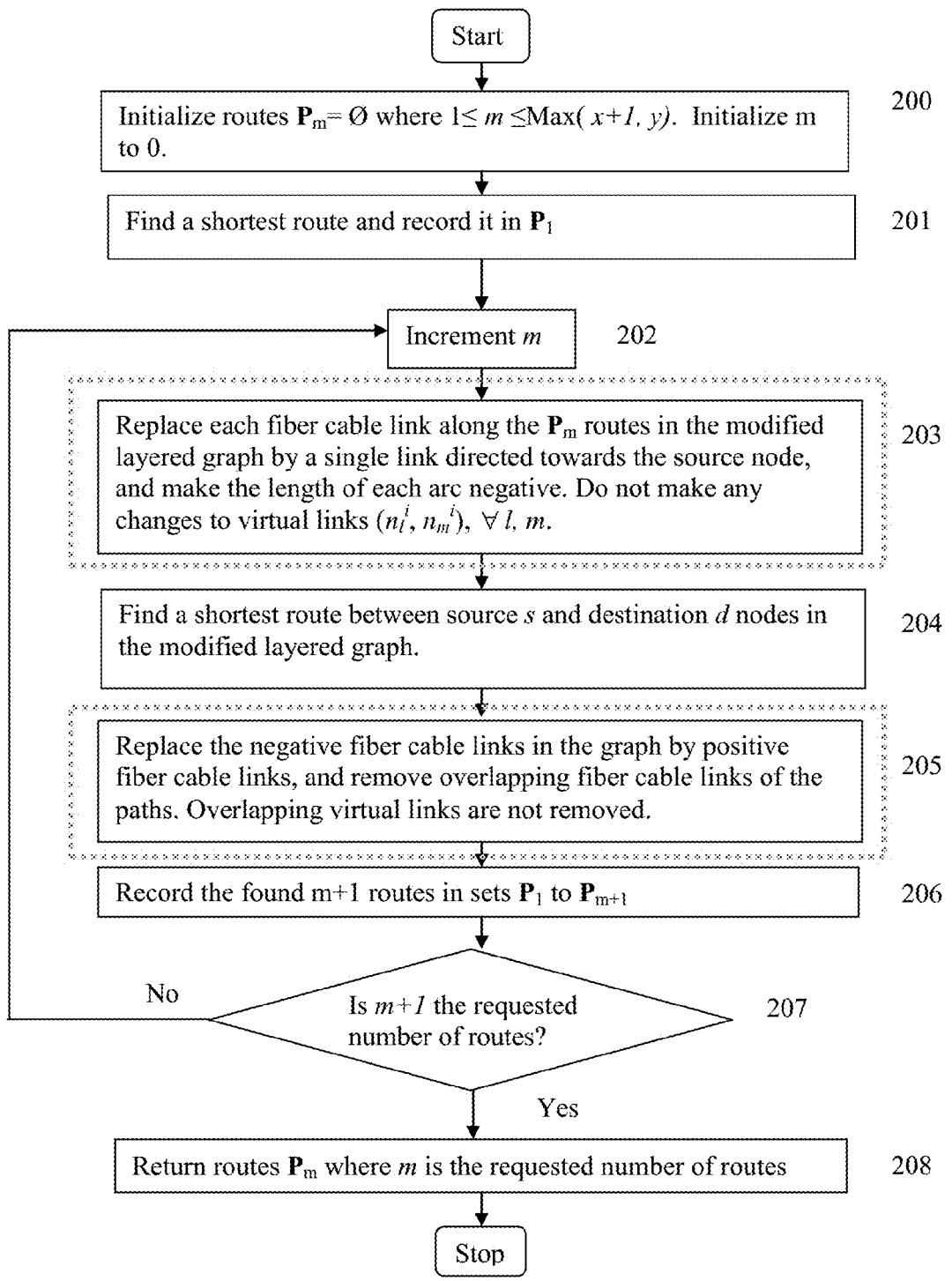
FIG. 3 is a flow diagram of a modified Bhadari's procedure, in accordance with the invention.

Referring now to FIG. 3, there is shown a flowchart of the 2-step-optimization procedure, in accordance with the invention, which is explained as follows.

At step 200, the procedure initializes a route $P_m$ to an empty set, where $1 \leq m \leq Max(x+1, y)$. Index m is initialized to 0. The first route $P_1$ is initialized to $I_k$.

At step 201, the procedure finds the shortest route between source and destination nodes, and record the route in a set $P_1$. At step 202, the procedure increments the index m.

At step 203, the procedure replaces each fiber cable link along the $P_m$ routes in the modified layered graph by a single link directed towards the source node, and makes the length of each arc negative. Any virtual links $(n_l^i, n_m^i)$, $\forall l, m$ along the routes are not changed.

At step 204, the procedure finds a shortest path between source s and destination d nodes in the modified layered graph.

At step 205, the procedure finds a shortest path between source s and destination d nodes in the modified layered graph. At step 206, the procedure records the found m+1 routes in sets $P_1$ to $P_{m+1}$.

At step 207, the procedure step checks whether the number of routes found so far is equivalent to the requested routes. If the number of routes is not equivalent to the requested routes, then the procedure follows step 201, otherwise the procedure follows the step 207.

Lastly at step 208, the procedure returns the routes $P_m$, where m is the requested number of routes.

From the foregoing, it can be appreciated that the present invention provides a procedure to optimally configure survivable networks based on customer requirements. The inventive procedure is fast in that it finds the solution in time that is polynomial of the input size. The inventive procedure is quick, and results a solution in real time. Generalized for any required number of protection paths (any levels of survivability): The inventive procedure addresses the generalized routing and wavelength assignment problem with variable number of 1+1 dedicated and shared connections for the first time. Generalized for multi-cable and multi-fiber networks: The inventive procedure is applicable to multi-fiber networks with any distribution of fibers among given fiber cables. The inventive procedure is resource efficient in that it improves the wavelength utilization of networks. The inventive procedure is flexible in that it allows flexible setting to achieve different fairness levels of network resource utilization.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. For example, those of ordinary skill in the art will recognize that multiple configurations for the optical processing path shown in FIG. 4 are possible to achieve the same signal transformation effect. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A joint optimization method for finding a routing and wavelength assignment for a given set of network traffic demands in a wavelength-division multiplexing network requiring variable number of dedicated and shared protections, said method comprising the steps of:
   i) constructing with a processor a layered graph for finding fiber cable link-disjoint routes in a multi-fiber cable in the network;
   ii) applying, jointly, a routing and first-fit wavelength assignment for finding x+1 number of fiber cable link-disjoint routes operating on different wavelengths in the layered graph;
   iii) modifying the layered graph to maximize sharing of wavelengths;
   iv) jointly applying routing and wavelength assignment based on maximum sharing factor to find y number of fiber cable link-disjoint routes in the layered graph;
   v) finding working 1+1 dedicated connections and then shared connections, the connections being supported by one or more transponders provisioned at end nodes in the network;
   vi) searching k different solutions of dedicated and shared connections operating on K different wavelengths;
   vii) selecting one of said solutions requiring a minimum number of wavelength links; and
   viii) through a modified Bhandari's procedure, finding link-disjoint routes in the layered graph by determining a shortest route between source and destination nodes, recording the route in a set $P_1$ with an index m and replacing each fiber cable link along the $P_m$ routes in the modified layered graph by a single link directed towards the source node, making a length of each arc negative, finding a shortest path between source s and destination d nodes in the modified layered graph and recording the found m+1 routes in sets $P_1$ to $P_m$.

2. The method of claim 1, wherein said step i) comprises said layered graph being used for finding fiber cable link-disjoint routes in multi-fiber multi-cable networks with any distribution of fibers within fiber cables.

3. The method of claim 1, wherein said step ii) comprises constructing a layered graph starting from the lowest wavelength to the highest wavelength, and apply the modified Bhandari's procedure to find x+1 number of fiber cable link disjoint routes that require minimum wavelength links at a specific wavelength with found connections through this method operable on the same wavelength.

4. The method of claim 3, wherein said step ii) comprises finding x+1 number of fiber cable link disjoint routes in multiple iterations by constructing a layered graph at different wavelengths with found connections being operable on different wavelengths.

5. The method of claim 1, wherein said step iii) comprises assigning a cost to each fiber cable link for routing through fiber cable links within which a wavelength can be shared.

6. The method of claim 1, wherein said step iv) comprises based on the order of wavelengths that can be shared the most, a layered graph is modified, and y link disjoint routes are searched using the modified Bhandari's procedure for finding y number of fiber cable link disjoint routes requiring minimum new wavelength links.

7. The method of claim 1, wherein said step v) comprises finding working and 1+1 dedicated connections first, and then using routing information of the found working and 1+1 dedicated connections for finding shared connections such that the sharing of wavelengths can be maximized.

8. The method of claim 1, wherein said step vii) comprises by selecting a solution that requires minimum number of new wavelengths out of K potential solutions, the procedure maximizes the utilization of wavelength resources.

9. The method of claim 1, wherein said step i) comprises, for the layered graph, a fiber cable link representing a fiber cable connecting a pair of nodes, each fiber cable consisting of many fibers, each fiber consisting of certain number of wavelengths, and the layered graph being useable for finding fiber cable link-disjoint routes between a pair of nodes with any distribution of fibers, said constructing the layered graph being scalable as number of wavelengths increases in a network.

10. The method of claim 1, wherein said step ii) comprises modifying the layered graph starting from a lowest wavelength to a highest wavelength and applying the modified Bhandari's procedure to find exactly x+1 number of fiber cable link disjoint routes on a modified layered graph thus enabling finding exactly x+1 number of fiber cable link disjoint routes operable on a specific wavelength with minimum wavelength links.

11. The method of claim 1, wherein said step ii) comprises modifying the layered graph starting from a lowest wavelength to a highest wavelength, and applying the modified Bhandari's procedure to find up to x+1 number of fiber cable link-disjoint routes, wherein if exactly x+1 number of fiber cable link disjoint routes are not available, then finding remaining routes on a next wavelength by removing links along already found routes with found routes being operable on different wavelengths.

12. The method of claim 1, wherein said step iii) comprises assigning a cost to each fiber cable link for enabling sharing of wavelengths being maximized.

13. The method of claim 1, wherein said layered graph is modified in a descending order of a sharing factor of wavelengths, and then, using the modified Bhandari's procedure up to y number of fiber cable link-disjoint routes are searched, wherein if they number of fiber cable link-disjoint routes is not available at the same wavelength, then the remaining routes are searched by modifying the layered graph according to a next wavelength from a sorted pool of wavelengths and removing the links along from those already found working, backup, and shared routes, enabling finding y number of shared routes using minimum number of new wavelengths.

14. The method of claim 1, wherein said step v) comprises finding working and 1+1 dedicated fiber cable link disjoint connections at the same time in a first step, and shared connections separately in a second step, includes finding shared connections such that sharing of wavelengths can be maximized using those already found working and backup routing information in the first step.

15. The method of claim 1, wherein said step vi) comprises searching K potential working connections, x number of 1+1 dedicated connections, and y number of shared connections.

16. The method of claim 1, wherein said step vi) comprises enabling selecting a solution that requires minimum number of new wavelengths out of K potential solutions.

* * * * *